No. 724,390. PATENTED MAR. 31, 1903.
G. HIRSCHELL.
HOSE COUPLING.
APPLICATION FILED NOV. 21, 1902.
NO MODEL.
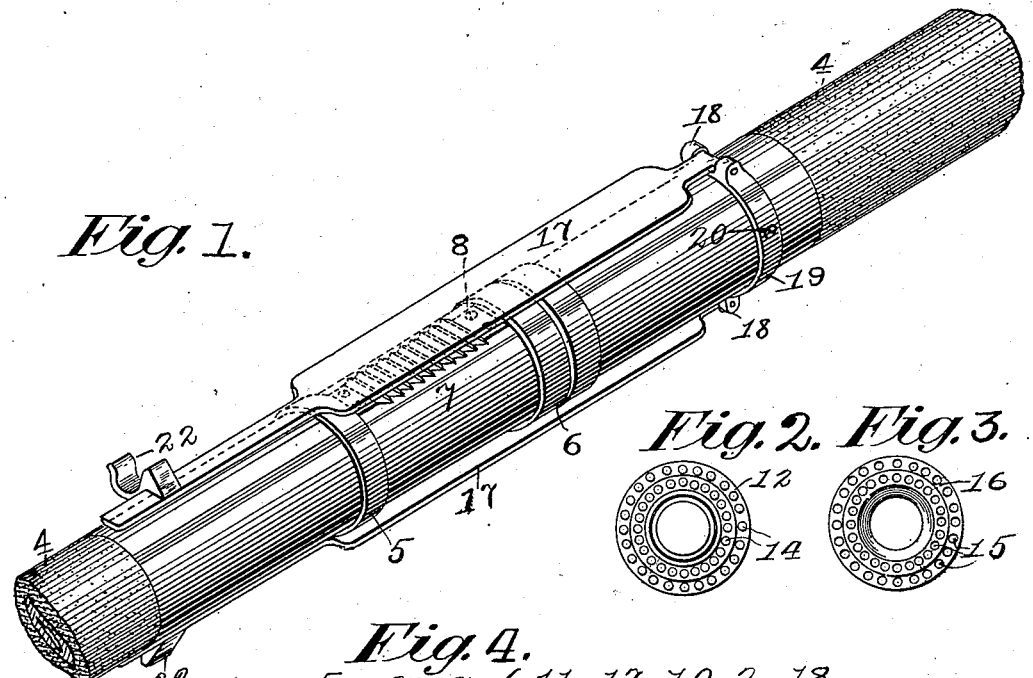
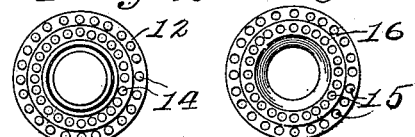
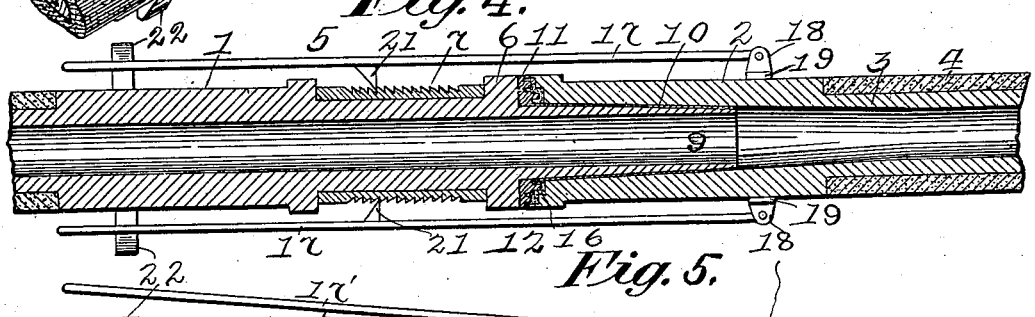
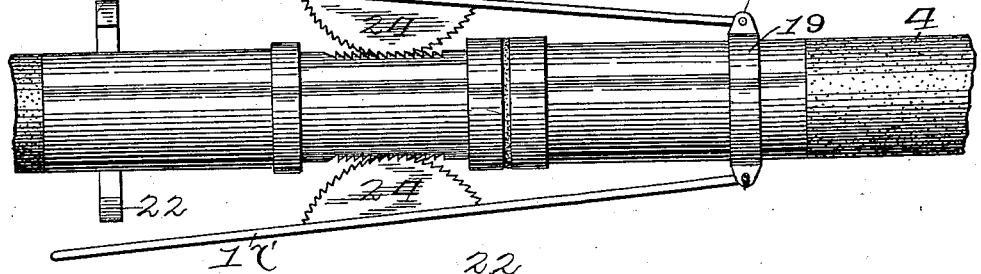
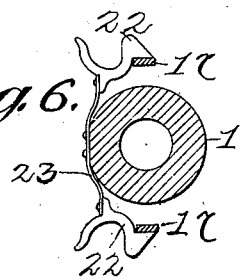
Witnesses:
Inventor:
Geo. Hirschell
By
Attorneys.

UNITED STATES PATENT OFFICE.

GEORGE HIRSCHELL, OF PITTSBURG, PENNSYLVANIA.

HOSE-COUPLING.

SPECIFICATION forming part of Letters Patent No. 724,390, dated March 31, 1903.

Application filed November 21, 1902. Serial No. 132,236. (No model.)

*To all whom it may concern:*

Be it known that I, GEORGE HIRSCHELL, a citizen of the United States of America, residing at Pittsburg, in the county of Allegheny and State of Pennsylvania, have invented certain new and useful Improvements in Hose-Couplings, of which the following is a specification, reference being had therein to the accompanying drawings.
This invention relates to certain new and useful improvements in hose-couplers; and the object of the invention is to provide novel and efficient means for joining one section of hose to another section in such a manner as to permit the quick coupling thereof, as well as the quick uncoupling of the sections when desired.

Briefly described, the invention comprises a male and a female section to which the sections of the hose are attached. These male and female sections are adapted to be coupled together in a manner whereby a perfectly tight joint is obtained. The male section or member carries a conical nipple, which is adapted to extend into the flared or conical end of the female member or section. The female member or section carries a washer on its abutting end, provided with a series of openings or recesses to receive studs or pins carried on the washer of the male member or section. Clamping-levers are pivotally secured to one of the sections and carry teeth to engage with the teeth provided therefor on the opposite section, and means is provided for securing these clamping-levers in the locked position.

In describing the invention in detail reference is had to the accompanying drawings, forming a part of this specification, and wherein like numerals of reference indicate like parts throughout the several views, in which—

Figure 1 is a detail perspective view showing the coupler in the coupled position, the sections of hose being broken away. Fig. 2 is an end view of the male member. Fig. 3 is a like view of the female member. Fig. 4 is a central longitudinal sectional view of the coupler in the coupled position. Fig. 5 is a side elevation of the modified form of construction, showing the clamping-levers in the unlocked position. Fig. 6 is a transverse vertical sectional view of the male member, showing the means for securing the clamp-levers in side elevation.

In the accompanying drawings, 1 indicates a male member, and 2 the female member, each of which is provided with ends 3, reduced in diameter to receive the ends 4 of the hose-sections, which are sleeved onto said reduced portions or may be secured thereto in any suitable manner. The male member or section 1 carries integral annular ribs 5 6, and placed on the opposite faces of the male section between these integral ribs—that is, on the upper and lower faces of the section 1— are rack-bars 7, which may be secured by means of screws 8 or any other suitable means. The male section 1 at its matching end is provided with a tubular extension 9, which is preferably provided with an exterior sheath or covering of pliable material 10, such as leather, rubber, or the like. Seated against the annular shoulder 11 at the inner end of the extension 9 is a gasket or washer 12, provided with a series of studs or pins 14, and these pins or studs are adapted to engage in recesses or openings 15, provided therefor in the washer or gasket 16, which is seated in the shouldered recess in the inner end of the section 2. The washer 12 is circumferentially shouldered to conform to the circumferential shoulders of the washer 16. After the male and female sections have been joined together in the manner shown in Fig. 4 of the drawings I secure the same by means of a pair of clamping-levers 17, which at their one end are pivoted between the lugs 18, carried by the segmental clamp member 19, which are affixed by screws 20 or other suitable means to the exterior of the section 2. These clamp members 17 in this form of construction are provided with a tooth 21 to engage with the teeth of the rack 7, and the levers are held in the closed position by means of catches 22, which are secured to the spring 23, one catch being provided for each of the levers and the spring being secured centrally of its length to the side of the male section 1, as seen in Fig. 6.

In Fig. 5 I show the clamp-levers 17' of a slightly-modified form, they being pivoted to collars 19 in the same manner as construction heretofore described, the only difference being that this form of construction has employed in connection therewith toothed blocks 24 to engage with the rack 7. The lever of this form of construction is fastened by catches 22, the same as heretofore described. The employment of the surrounding sheath or covering 10 and the interlocking gaskets or washers 12 16 produces an absolutely water-tight joint, and the bore in the female section being tapered or flared to receive the tapered extension 9 of the male section the diameter of the bore throughout the coupling is in no wise decreased.

It will be observed that when the clamp-levers are disengaged from their catches the coupling may be readily disconnected; also, that the parts may be readily connected together and when the clamp-levers are engaged with the catches are securely held.

Having fully described my invention, what I claim as new, and desire to secure by Letters Patent, is—

1. In a hose-coupling, a male and a female section, a tapered extension carried by one of said sections to fit within the other of said sections, a washer carried by one of the sections and provided with studs or pins, a washer carried by the other of said sections and provided with openings to receive said studs or pins, a rack secured to opposite sides of one of the sections, clamp-levers pivotally secured to one of the sections, and spring means secured to the other of the sections for securing said levers in the locked position, substantially as described.

2. In a hose-coupling, a male section provided with a tapered extension having a sheath or covering, a washer carried by said extension and provided with studs or pins, a female section having flared openings to receive the tapered extension, a washer carried by the female section and provided with openings to receive said studs or pins, racks secured to the male section, clamp-levers pivoted to the female section, and spring-catches carried by the male section to engage said clamp-levers and hold the same in the locked position, substantially as described.

3. A hose-coupling comprising a male and a female section, said male section having a tapered extension thereon, a washer having studs thereon carried by said extension, said female section adapted to receive the tapered extension of the male section, a washer carried thereby, having openings therein adapted to receive the studs of the male section, racks secured on the opposite sides of the male section, clamp-levers carried by the female section having means thereon for engagement with the racks of the male section, and spring means carried by the latter section adapted to engage and hold the clamp-levers in locked position, substantially as described.

In testimony whereof I affix my signature in the presence of two witnesses.

GEORGE HIRSCHELL.

Witnesses:
JOHN GROETZINGER,
E. E. POTTER.